United States Patent
Yajima et al.

(10) Patent No.: US 11,142,482 B2
(45) Date of Patent: Oct. 12, 2021

(54) CERAMIC COMPOSITION AND ELECTRONIC COMPONENT USING THE CERAMIC COMPOSITION

(71) Applicant: TAIYO YUDEN CO., LTD., Tokyo (JP)

(72) Inventors: Keiko Yajima, Tokyo (JP); Takashi Nakajima, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

(21) Appl. No.: 16/512,822

(22) Filed: Jul. 16, 2019

(65) Prior Publication Data
US 2020/0031721 A1    Jan. 30, 2020

(30) Foreign Application Priority Data
Jul. 24, 2018  (JP) .............................. JP2018-138437

(51) Int. Cl.
*C04B 35/47*   (2006.01)
*C04B 35/453*  (2006.01)
*C04B 35/10*   (2006.01)
*C04B 35/45*   (2006.01)

(52) U.S. Cl.
CPC .............. *C04B 35/47* (2013.01); *C04B 35/10* (2013.01); *C04B 35/45* (2013.01); *C04B 35/453* (2013.01)

(58) Field of Classification Search
CPC ......... C04B 35/47; C04B 35/10; C04B 35/45; C04B 35/453
See application file for complete search history.

(56) References Cited

U.S. PATENT DOCUMENTS

2006/0040819 A1    2/2006  Kataoka et al.

FOREIGN PATENT DOCUMENTS

| JP | 2001-278657 A |   | 10/2001 |
|----|---------------|---|---------|
| JP | 2003-286074 A |   | 10/2003 |
| JP | 2005-289701 A |   | 10/2005 |
| JP | 2006-273676 A |   | 10/2006 |
| JP | 2006-523602 A |   | 10/2006 |
| JP | 2010-037126 A |   | 2/2010 |
| JP | 2010037126 A  | * | 2/2010 |
| JP | 4802039 B2    | * | 10/2011 |
| JP | 2012-188339 A |   | 10/2012 |
| WO | 2004/076380 A1 |  | 9/2004 |

OTHER PUBLICATIONS

JP-4802039-B2 machine translation via EspaceNet (Year: 2011).*
JP-2010037126-A machine translation via EspaceNet (Year: 2010).*

* cited by examiner

*Primary Examiner* — Karl E Group
*Assistant Examiner* — Cameron K Miller
(74) *Attorney, Agent, or Firm* — Pillsbury Winthrop Shaw Pittman, LLP

(57) ABSTRACT

A ceramic composition in one embodiment contains, relative to 100 parts by mass of diopside crystal powder, 0.3 to 1.5 parts by mass of a Li component in terms of an oxide thereof and 0.1 to 1 part by mass of a B component in terms of an oxide thereof. In this embodiment, the content of the Li component in terms of an oxide thereof is larger than the content of the B component in terms of an oxide thereof. In this embodiment, a total content of the Li component and the B component is 2.25 parts by mass or less in terms of oxides thereof.

7 Claims, 1 Drawing Sheet

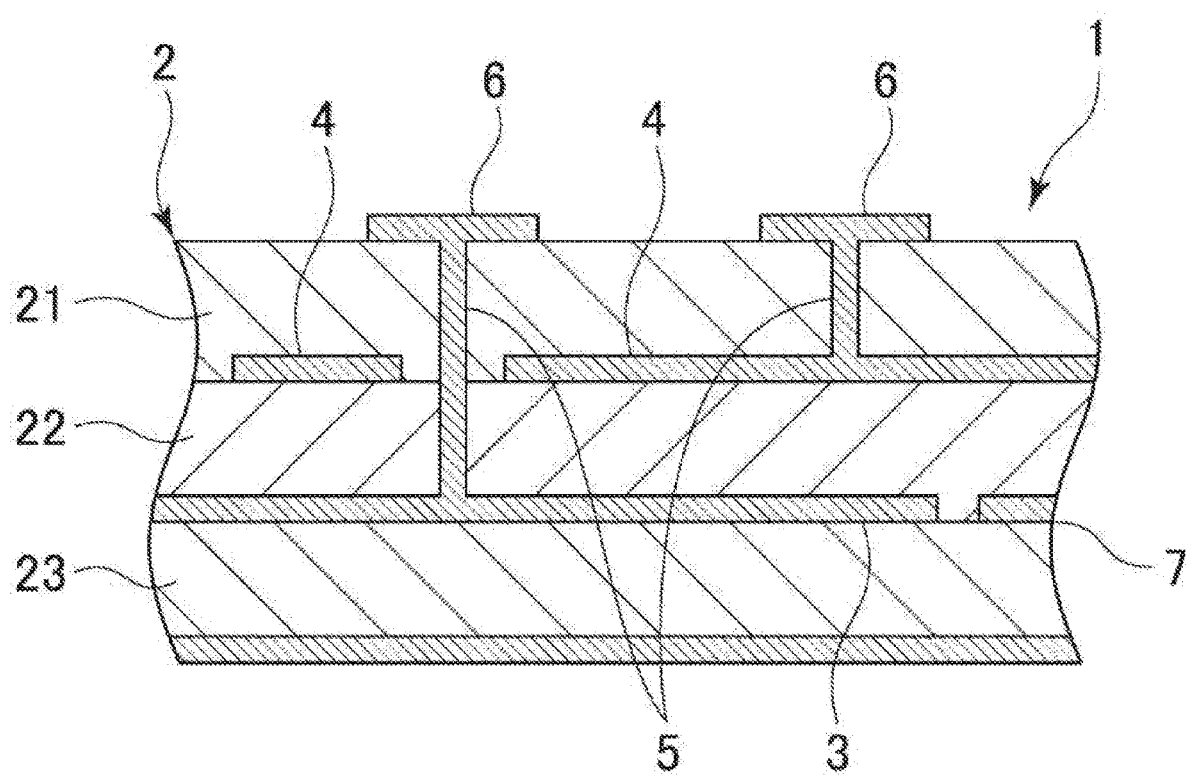

CERAMIC COMPOSITION AND ELECTRONIC COMPONENT USING THE CERAMIC COMPOSITION

CROSS-REFERENCE TO RELATED APPLICATIONS

This application is based on and claims the benefit of priority from Japanese Patent Application Serial No. 2018-138437 (filed on Jul. 24, 2018), the contents of which are hereby incorporated by reference in their entirety.

TECHNICAL FIELD

The present disclosure relates to a ceramic composition and an electronic component using the ceramic composition.

BACKGROUND

With the increasing speed of information communications, it has been demanded that high-frequency signals be transmitted without loss. To this end, a low-resistance metal material such as copper or silver is used as a material for an internal conductor of an electronic component of an information communication device. In a manufacturing process of the electronic component, the internal conductor is formed by co-firing a conductive paste applied to a substrate material with the substrate material. When firing is performed at a high temperature, a low-resistance metal might be diffused into the substrate material, and it is, therefore, demanded that the substrate material be sinterable at a low temperature.

Attention has been given to a ceramic material containing a diopside crystal as a principal crystal, which is sinterable at a low temperature and has low dielectric loss. Such a ceramic material containing a diopside crystal as a principal crystal is disclosed in each of Japanese Patent Application Publication No. 2001-278657, Japanese Patent Application Publication No. 2003-286074, International Publication No. WO 2004/076380, Japanese Patent Application Publication No. 2005-289701, Japanese Patent Application Publication No. 2006-273676, Japanese Patent Application Publication (Translation of PCT Application) No. 2006-523602, Japanese Patent Application Publication No. 2010-037126, and Japanese Patent Application Publication No. 2012-188339.

In recent years, greater importance has been placed on an information communication function in automobiles, and it has, therefore, become a practice to install an information communication device in an automobile as one of major devices of the automobile. In many cases, such an on-board information communication device is integrated or combined with an electronic control unit of the automobile. The electronic control unit of the automobile is often installed in an engine room. There is, therefore, an increasing demand that an electronic component of the information communication device integrated or combined with the electronic control unit of the automobile be also highly reliable under a high-temperature environment. A guaranteed temperature for high-temperature performance required of such an electronic component has been increasing, and as compared with the guaranteed temperature of 125° C. conventionally required, the guaranteed temperature recently required may be 150° C.

SUMMARY

One object of the present disclosure is to provide a ceramic composition that is sinterable at a low temperature, has low dielectric loss in a high-frequency region, and is highly reliable under a high-temperature environment, and an electronic component using the ceramic composition.

The inventors of the present invention have found that in a sintered ceramic composition, a sintering additive, such as $Li_2O$ and $B_2O_3$, used to sinter a ceramic material containing a diopside crystal as a principal crystal segregates into a periphery or a grain boundary of diopside crystal grains, and segregation substances thus formed might deteriorate an insulation property of the ceramic composition particularly under a high-temperature environment. The inventors of the present invention have also found that, when a content ratio of $Li_2O$ is lower than a content ratio of $B_2O_3$ in the sintering additive, in the course of sintering, diopside is dissolved insufficiently in the sintering additive being present as a liquid phase, so that a resulting sintered body of the ceramic composition lacks density.

In embodiments of the present invention, based on the above-described findings, suitable contents of a Li component and a B component relative to diopside crystal powder are specified. A ceramic composition in one embodiment contains, relative to 100 parts by mass of the diopside crystal powder, 0.3 to 1.5 parts by mass of the Li component in terms of an oxide thereof and 0.1 to 1 part by mass of the B component in terms of an oxide thereof. In the above-described embodiment, the content of the Li component in terms of an oxide thereof is larger than the content of the B component in terms of an oxide thereof. Since lower limits of the contents of the Li component and the B component are 0.3 parts by mass and 0.1 parts by mass, respectively, and the content of the Li component is larger than the content of the B component, a total content of the Li component and the B component is larger than 0.4 parts by mass in terms of oxides thereof. In the above-described embodiment, the total content of the Li component and the B component is 2.25 parts by mass or less in terms of oxides thereof.

The ceramic composition in one embodiment further contains 4 to 19 parts by mass of $SrTiO_3$ powder relative to 100 parts by mass of the diopside crystal powder.

The ceramic composition in one embodiment contains 6 to 10 parts by mass of $SrTiO_3$ powder relative to 100 parts by mass of the diopside crystal powder.

The ceramic composition in one embodiment further contains a total of 0 to 3 parts by mass of an Ag component and a Cu component in terms of oxides thereof relative to 100 parts by mass of the diopside crystal powder.

The ceramic composition in one embodiment contains a total of 0 to 0.5 parts by mass of the Ag component and the Cu component in terms of oxides thereof.

The ceramic composition in one embodiment further contains, at least one component selected from a group consisting of a Zn component, a Co component, an Al component, a Zr component, a Bi component, a Ba component, a K component, and a Na component, wherein a total content of the Li component, the B-component, and the at least one component is 0.5 to 6 parts by mass in terms of oxides thereof relative to 100 parts by mass of the diopside crystal powder.

An electronic component in one embodiment includes a ceramic layer obtained by firing the above-described ceramic composition and a conductor layer provided on a surface of and/or in an interior of the ceramic layer and obtained through co-firing with the ceramic composition.

ADVANTAGES

According to the embodiments of the present invention, there are provided a ceramic composition that is sinterable at a low temperature, has low dielectric loss in a high-frequency region, and is highly reliable under a high-temperature environment, and an electronic component using the ceramic composition.

BRIEF DESCRIPTION OF THE DRAWINGS

FIG. 1 is a sectional view schematically showing a longitudinal section of a multilayer filter using a ceramic composition according to one embodiment of the present invention.

DESCRIPTION OF EXAMPLE EMBODIMENTS

A ceramic composition in one embodiment of the present invention will be hereinafter described. The ceramic composition in one embodiment of the present invention contains, as a principal component, diopside crystal power obtained by a solid-phase reaction method. The diopside crystal powder is manufactured by mixing ceramic powder made of a non-glass material such as oxides and carbonates of Si, Mg, and Ca to form a mixture having a stoichiometric ratio of diopside (Ca:Mg:Si=1:1:2), heating the mixture at a temperature equal to or lower than a melting point, sintering it by the solid-phase reaction method, and pulverizing the sintered mixture to a predetermined grain size.

The diopside crystal powder obtained by sintering the above-described ceramic powder is adjusted to have, preferably, the content of Si in terms of an oxide thereof, namely $SiO_2$, of 53.5 to 62 mass %, the content Mg in terms of an oxide thereof, namely MgO, of 12 to 22 mass %, and the content of Ca in terms of an oxide thereof, namely CaO, of 21 to 32 mass %, and more preferably, the content of $SiO_2$ of 56 to 59.5 mass %, the content of MgO of 15 to 19 mass %, and the content of CaO of 23.5 to 29.5 mass %. Adjusting the contents of $SiO_2$, MgO, and CaO to be in the above-described ranges facilitates deposition of a diopside crystal.

When the content of $SiO_2$ is more than 62 mass %, a wollastonite crystal is likely to be formed, so that dielectric loss is increased and strength may also be decreased. Furthermore, when the content of $SiO_2$ is less than 53.5 mass %, an akermanite crystal is likely to be formed, so that dielectric loss may be increased.

When the content of MgO is more than 22 mass %, a forsterite crystal is likely to be formed, so that strength is likely be decreased. Furthermore, when the content of MgO is less than 12 mass %, a wollastonite crystal is likely to be formed, so that dielectric loss is likely to be increased.

When the content of CaO is more than 32 mass %, a wollastonite crystal and an akermanite crystal are likely to be formed, so that dielectric loss is increased and strength is likely be decreased. Furthermore, when the content of CaO is less than 21 mass %, a forsterite crystal is likely to be formed, so that strength is likely be decreased.

In one embodiment, an average grain size of the diopside crystal powder is in a range of 0.1 to 2 µm. When the average grain size of the diopside crystal powder is less than 0.1 µm, a specific surface area (BET value) of the diopside crystal powder is increased, so that a green sheet formed from a ceramic material containing the diopside crystal powder is likely to be decreased in density. A ceramic layer formed by firing the green sheet might largely contract due to its low density. As a result, a conductor layer formed on the ceramic layer through co-firing is likely to be peeled off from the ceramic layer. When the average grain size of the diopside crystal powder is more than 2 µm, it is difficult to form a thin green sheet from the ceramic material containing the diopside crystal powder. The average grain size of the diopside crystal powder may refer to a value thereof obtained by grain size distribution measurement based on a laser diffraction/scattering method.

The ceramic composition according to one embodiment of the present invention may contain $SrTiO_3$ powder. A temperature coefficient τf of resonance frequency of the diopside crystal alone exhibits a negative characteristic (approximately $-65 \times 10^{-6}/°C$.). On the other hand, the temperature coefficient τf of resonance frequency of a $SrTiO_3$ crystal is $1670 \times 10^{-6}/°C$., and thus the temperature coefficient τf of resonance frequency of the $SrTiO_3$ crystal alone exhibits a positive characteristic. Accordingly, by adding the $SrTiO_3$ powder to the ceramic composition, the temperature coefficient τf of resonance frequency can be adjusted to approximate to zero.

The $SrTiO_3$ powder is sintered with the diopside crystal, and thus as a crystalline phase obtained after the sintering, a (xCa, 1-xSr) TiO3 type perovskite compound is formed in which $SrTiO_3$ is present alone or calcium is dissolved into $SrTiO_3$ to form a solid solution. The temperature coefficient τf of resonance frequency of the perovskite compound exhibits a positive value, and thus by adding a small amount of the $SrTiO_3$ powder, the temperature coefficient τf of resonance frequency of the ceramic composition (sintered body) containing the diopside crystal can be increased to approximate to zero.

Here, for a resonance frequency of a composition formed by combining different types of materials, the following formula (1) is empirically known to hold.

{Temperature Coefficient τf of Resonance Frequency of Composite Body=Σ(Volume Fractions (vol %) of Components×Temperature Coefficients τf of Resonance Frequency of Components)}    (1)

Furthermore, also for a permittivity of the composition formed by combining different types of materials, the following formula (2) is empirically known to hold.

{Log(Permittivity ε of Composite Body)=σ(Volume Fractions (vol %) of components×log(Permittivities ε of Components)}    (2)

Further, the temperature coefficient τf of resonance frequency and permittivity ε of $SrTiO_3$ are $τf=1670 \times 10^{-6}$ and ε=255, respectively. Thus, by adding the $SrTiO_3$ powder to the ceramic material containing the diopside crystal as a principal component and firing the ceramic material to obtain the ceramic composition, the permittivity and temperature coefficient of resonance frequency of the ceramic composition can be adjusted.

The ceramic composition according to one embodiment of the present invention contains 4 to 19 parts by mass of the $SrTiO_3$ powder relative to 100 parts by mass of the diopside crystal powder. When the content of the $SrTiO_3$ powder is within the above-described range, while dielectric loss in a high-frequency region is reduced, the temperature coefficient τf of resonance frequency can be adjusted to approximate to zero.

The ceramic composition according to one embodiment of the present invention contains 6 to 10 parts by mass of the $SrTiO_3$der relative to 100 parts by mass of the diopside crystal powder. When the content of the SiTiO3 powder is within the above-described range, the temperature coefficient τf of resonance frequency can be adjusted to have a value approximate to zero.

In one embodiment, the $SrTiO_3$ powder has an average grain size of 0.1 to 2 µm for appropriately controlling sinterability, strength, and the temperature coefficient τf of resonance frequency of the ceramic composition (sintered body) obtained by sintering. In one embodiment, the $SrTiO_3$ powder has an average grain size of 0.8 to 1.5 µm in order to improve dispersibility of the $SrTiO_3$ powder with respect to the diopside crystal powder. The average grain size of the $SrTiO_3$ powder may refer to a value thereof obtained by grain size distribution measurement based on a laser diffraction/scattering method.

The ceramic composition according to one embodiment contains a Li component. Examples of the Li component include a Li oxide ($Li_2O$). The ceramic composition containing the Li component is obtained by, for example, firing a ceramic material to which the Li oxide is added. The Li component (for example, the Li oxide) is contained in the ceramic material, and thus a liquid phase is formed at the time of sintering, so that a sintering temperature of the ceramic material can be reduced. In the ceramic composition (sintered body) in one embodiment, the Li component is contained in an amount of 0.3 to 1.5 parts by mass in terms of an oxide thereof ($Li_2O$) relative to 100 parts by mass of the diopside crystal powder. When the content of the Li component in the ceramic composition is less than 0.3 parts by mass in terms of an oxide thereof, sinterability of the ceramic composition is deteriorated, so that no sintering thereof occurs at a low temperature (for example, 900° C. or lower). Furthermore, when the content of Li in the ceramic composition is more than 1.5 parts by mass, the amount of $Li_2O$ that segregates into a periphery or a grain boundary of diopside crystal grains is increased to deteriorate an insulation property under a high-temperature environment.

The ceramic composition in one embodiment contains a B component. Examples of the B component include a B oxide ($B_2O_3$). The ceramic composition containing the B component is obtained by, for example, firing a ceramic material to which the B oxide is added. The B component (for example, the B oxide) is contained in the ceramic material, and thus a liquid phase is formed at the time of sintering, so that a sintering temperature of the ceramic material can be reduced. In the ceramic composition (sintered body) in one embodiment, the B component is contained in an amount of 0.1 to 1 part by mass in terms of an oxide thereof ($B_2O_3$) relative to 100 parts by mass of the diopside crystal powder. When the content of the B component in the ceramic composition is less than 0.1 parts by mass in terms of an oxide thereof, sinterability of the ceramic composition is deteriorated, so that no sintering thereof occurs at a low temperature (for example, 900° C. or lower). Furthermore, when the content of B in the ceramic composition is more than 1 part by mass, the amount of $B_2O_3$ that segregates into the periphery or the grain boundary of the diopside crystal grains is increased to deteriorate the insulation property under the high-temperature environment.

In the ceramic composition in one embodiment, the Li component and B component described above are essential components. The ceramic composition in one embodiment contains the Li component and the B component so that the content of the above-described Li component in terms of an oxide thereof is larger than the content of the above-described B component in terms of an oxide thereof. The content of the Li component is larger than the content of the B component in the ceramic composition, and thus in the course of densification, diopside is likely to be dissolved in Li being present as a liquid phase, so that a dense sintered body of the ceramic composition is obtained. Furthermore, a total content of the Li component and the B component described above is 2.25 parts by mass or less in terms of oxides thereof. The reason for this is that when the total content of the Li component and the B component is equal to or more than 2.25 parts by mass, the volume of segregation substances of $Li_2O$ and $B_2O_3$ at the periphery or the grain boundary of the diopside crystal grains are increased to deteriorate the insulation property under the high-temperature environment.

The ceramic composition in one embodiment may contain an Al component. Examples of the Al component include an Al oxide, an Al carbonate, and a compound containing any other Al component. The ceramic composition containing the Al component is obtained by, for example, firing a ceramic material to which the Al component is added. The Al component is contained in the ceramic material, and thus a resulting sintered ceramic composition has a strong grain boundary structure and improved chemical durability of the grain boundary. There is, therefore, obtained a ceramic composition having high plating resistance. The ceramic composition in one embodiment may contain 0.05 to 3.5 parts by mass of the Al component in terms of an oxide thereof ($Al_2O_3$) relative to 100 parts by mass of the diopside crystal powder. When the content of the Al component in the ceramic composition is less than 0.05 parts by mass in terms of an oxide thereof, an effect of adding the Al component is too poor to provide a sintered body of the ceramic composition having excellent plating resistance. Furthermore, when the content of the AL component is more than 6 parts by mass, sinterability of the ceramic composition is deteriorated, so that no sintering thereof occurs at a low temperature (for example, 900° C. or lower).

The ceramic composition in one embodiment may contain a Zn component. Examples of the Zn component include a Zn oxide, a Zn carbonate, and a compound containing any other Zn component. The ceramic composition containing the Zn component is obtained by, for example, firing a ceramic material to which the Zn component is added. The Zn component is contained, and thus a liquid phase is formed at the time of sintering, so that a sintering temperature of the ceramic material can be reduced. Furthermore, the Zn component is contained in the ceramic composition, and thus water resistance of the ceramic material can be improved. The ceramic composition in one embodiment may contain 0.05 to 5.1 parts by mass of the Zn component in terms of an oxide thereof (ZnO) relative to 100 parts by mass of the diopside crystal powder. When the content of the Zn component in the ceramic composition is less than 3.2 parts by mass in terms of an oxide thereof, sinterability of the ceramic composition is deteriorated, so that no sintering thereof occurs at a low temperature (for example, 900° C. or lower). When the content of the Zn component in the ceramic composition is more than 5.1 parts by mass, a Q×f value decreases to increase dielectric loss.

The ceramic composition in one embodiment may contain a Cu component and an Ag component. Examples of the Cu component include a Cu oxide, a Cu carbonate, and a compound containing any other Cu component. Examples of the Ag component include an Ag oxide, an Ag carbonate, and a compound containing any other Ag component. The ceramic composition containing the Cu component is obtained by, for example, firing a ceramic material to which the Cu component is added. The ceramic composition containing the Ag component is obtained by, for example, firing a ceramic material to which the Ag component is added. The Cu component is contained in the ceramic material, and thus when Cu or a Cu alloy is used as a material of a conductor metal and the conductor metal is co-fired with the ceramic material, it is possible to suppress elution of the conductor metal into a liquid phase of the ceramic material. The Ag component is contained in the ceramic composition, and thus when Ag or an Ag alloy is used as a material of a conductor metal and the conductor metal is co-fired with the ceramic material, it is possible to suppress elution of the conductor metal into a liquid phase of the ceramic material. By suppressing elution of the conductor metal into the ceramic material as described above, it is possible to suppress disappearance of a conductor at the time of sintering an electronic component formed of the ceramic composition. The ceramic composition in one embodiment may contain the Cu component and the Ag component in a total amount of 0 to 3 parts by mass, preferably, 0.05 to 1.0 part by mass in terms of oxides thereof ($CuO$, $Ag_2O$) relative to 100 parts by mass of the diopside crystal powder. In a case where the total content of the Cu component and the Ag component in the ceramic composition is less than 0.05 parts by mass in terms of oxides thereof, when the ceramic material for obtaining this ceramic composition is co-fired with a conductor metal, it may not be possible to prevent elution of the conductor metal into a liquid phase of the ceramic material. When the content of the Cu component in the ceramic composition is more than 0.7 parts by mass, fusion occurs at the time of sintering, and thus the ceramic composition (sintered body) is likely to be degraded in shape stability and insulation property. For this reason, the content of the Cu component in the ceramic composition may be less than 0.7 parts by mass. When the content of the Ag component in the ceramic composition is more than 3 parts by mass, plating resistance tends to be deteriorated. For this reason, the content of the Ag component in the ceramic composition may be less than 3 parts by mass.

The ceramic composition in one embodiment may contain a Co component. Examples of the Co component include a Co oxide, a Co carbonate, and a compound containing any other Co component. The ceramic composition containing the Co component is obtained by, for example, firing a ceramic material to which the Co component is added. The Co component is contained in the ceramic composition, and thus sinterability of the ceramic composition can be improved. The ceramic composition in one embodiment can contain 0 to 4.5 parts by mass, preferably, 0.05 to 4.5 parts by mass of the Co component in terms of an oxide thereof ($CoO$) relative to 100 parts by mass of the diopside crystal powder. When the content of the Co component is less than 0.05 parts by mass in terms of an oxide thereof, there is almost no effect of adding the Co component, and when the content of the Co component is more than 4.5 parts by mass, fusion is likely to occur at the time of sintering.

The ceramic composition in one embodiment may contain a Zr component. Examples of the Zr component include a Zr oxide, a Zr carbonate, and a compound containing any other Zr component. The ceramic composition containing the Zr component is obtained by, for example, firing a ceramic material to which the Zr component is added. The Zr component is contained in the ceramic composition, and thus plating resistance can be improved. The ceramic composition in one embodiment can contain 0.01 to 2 parts by mass of the Zr component in terms of an oxide thereof ($ZrO_2$) relative to 100 parts by mass of the diopside crystal powder.

The ceramic composition in one embodiment may contain a Bi component. Examples of the Bi component include a Bi oxide, a Bi carbonate, and a compound containing any other Bi component. The ceramic composition containing the Bi component is obtained by, for example, firing a ceramic material to which the Bi component is added. The Bi component is contained in the ceramic composition, and thus sinterability can be improved. The ceramic composition in one embodiment can contain 0.05 to 4.5 parts by mass of the Bi component in terms of an oxide thereof ($Bi_2O_3$) relative to 100 parts by mass of the diopside crystal powder.

The ceramic composition in one embodiment may further contain a Na component, a K component, a Ca component, a Mg component, a Ba component, a P component, and so on. The ceramic composition containing the Na component, the K component, the Ca component, the Mg component, the Ba component, and/or the P component is obtained by, for example, firing a ceramic material to which the Na component, the K component, the Ca component, the Mg component, the Ba component, and/or the P component is/are added.

The Na component or the K component is contained in the ceramic composition, and thus water resistance and acid resistance can be improved without significantly impairing sinterability in the ceramic composition (sintered body). The Na component and the K component can be contained in a total amount of 0 to 2 parts by mass in terms of oxides thereof ($Na_2O$, $K_2O$) relative to 100 parts by mass of the diopside crystal powder.

By adding the Ca component, the Mg component, and the Ba component to the ceramic material, a liquid phase is formed at the time of sintering, and thus a sintering temperature can be reduced. The Ca component, the Mg component, and the Ba component can be contained in a total amount of 0 to 5 parts by mass in terms of oxides thereof ($CaO$, $MgO$, $BaO$) relative to 100 parts by mass of the diopside crystal powder.

Furthermore, by adding the P component to the ceramic material, a liquid phase is formed at the time of sintering, and thus a sintering temperature can be reduced. The P component can be contained in an amount of 0 to 2 parts by mass in terms of an oxide thereof ($P_2O_5$) relative to 100 parts by mass of the diopside crystal powder.

The ceramic composition in one embodiment can contain at least one additional component selected from a group consisting of the Zn component, the Co component, the Al component, the Zr component, the Bi component, the Ba component, the K component, and Na component, and a total content of the Li component, the B-component, and the additional component is 0.5 to 6 parts by mass in terms of oxides thereof relative to 100 parts by mass of the diopside crystal powder.

Next, a method for manufacturing the ceramic composition in one embodiment will be hereinafter described. The ceramic composition in one embodiment is obtained in the following manner. That is, a ceramic material formed by blending predetermined amounts of the above-described diopside crystal powder, the Li component, the B component, and any component as required (for example, the Al component, the Zn component, the Cu component, the Ag component, the Co component, the Zr component, the Bi component, the Na component, the K component, the Ca component, the Mg component, the Ba component, the P component) is mixed under a wet environment such as water using ZrO2 balls or the like, and a binder, a plasticizer, a solvent and so on are added thereto as required, after which the ceramic material is molded into a predetermined shape and fired.

As the above-described binder, for example, a polyvinyl butyral resin, a methacrylate resin, or the like is used. As the plasticizer, for example, dibutyl phthalate, dioctyl phthalate, or the like is used. As the solvent, for example, toluene, methyl ethyl ketone, or the like can be used.

Molding is performed by any of various types of known molding methods such as, for example, a pressing method, a doctor blade method, an injection molding method, and a tape molding method. The ceramic material may be molded into any shape.

Firing is performed, for example, at 850° C. to 1000° C. for 0.5 to 3 hours in the atmosphere, an oxygen atmosphere, or a non-oxidizing atmosphere such as a nitrogen atmosphere.

In the ceramic composition (sintered body) in one embodiment obtained in this manner, a $SrTiO_3$ crystal may be present alone at any location selected from the inside of a grain, a grain boundary, and a triple point of diopside crystal grains. A $SrTiO_3$ crystal can be identified by electron microscope observation.

The sintered ceramic composition in one embodiment has high values of the permittivity ε and the Q×f value. The temperature coefficient τf of resonance frequency of the sintered ceramic composition is approximate to zero. The sintered ceramic composition has excellent plating resistance and less erosion of a base member caused by a plating process. Further, the sintered ceramic composition is excellent in water resistance, chemical resistance, and mechanical strength.

The permittivity ε of the sintered ceramic composition in one embodiment has a value in a range of 7 to 15. The Q×f value of the ceramic sintered body in one embodiment is 10000 or more. An absolute value of the temperature coefficient τf of resonance frequency of the ceramic sintered body in one embodiment is $30 \times 10^{-6}/°$ C. or less.

The sintered ceramic composition in one embodiment can be set so that its absolute value of the temperature coefficient τf of resonance frequency is $30 \times 10^{-6}/°$ C. or less and the Q×f value is 10000 or more, and thus can be favorably used for, for example, an electronic component for a high-frequency component such as a circuit board, a filter, or an antenna.

Next, an electronic component in one embodiment will be described with reference to FIG. 1. FIG. 1 is a sectional view schematically showing a longitudinal section of a multilayer filter 1 using the ceramic composition according to one embodiment of the present invention.

As shown, the multilayer filter 1 includes a ceramic base 2 formed at least partly of the above-described ceramic composition, a stripline 3, a ground plane 4, a via conductor 5, an external electrode 6, and an internal conductor pattern 7. The ceramic base 2 includes ceramic layers 21 to 23. The ground plane 4 is provided between the ceramic layer 21 and the ceramic layer 22. The stripline 3 and the internal conductor pattern 7 are provided between the ceramic layer 22 and the ceramic layer 23.

One example of a method for manufacturing the multilayer filter 1 will now be described. A binder, a solvent, a plasticizer, and so on are added to the above-described ceramic material to prepare slurry, which then is molded into a thin film by a method such as the doctor blade method, and thus a green sheet is manufactured. Next, through holes are formed through the green sheet with a punching machine or by mold pressing.

Next, a conductor paste containing a conductor metal such as Ag, an Ag alloy, Cu, a Cu alloy, or the like is printed by a screen printing method or the like on the green sheet through which the through holes have been formed, and thus an unfired internal conductor layer having a predetermined pattern is formed. Furthermore, the conductor paste is embedded into each of the through holes to form an unfired via conductor. After being fired, the internal conductor layer forms the stripline 3, the ground plane 4, or the internal conductor pattern 7, and the unfired via conductor embedded into each of the through holes forms the via conductor 5. A material forming the conductor paste is, preferably, a low-resistance material, and more preferably, Ag, an Ag alloy, Cu, or a Cu alloy. Examples of the Ag alloy include an Ag—Pd alloy and an Ag—Pt alloy. Examples of the Cu alloy include a Cu—Ca alloy, a Cu—Mg—Ca alloy, and a Cu—Ni—Fe alloy.

Next, a plurality of green sheets each including the unfired internal conductor layer and the unfired via conductor formed therein are stacked on each other to form a laminate, which then is pressure-bonded to manufacture an unfired laminate.

Next, the unfired laminate is subjected to a binder removal process and then cut into a predetermined shape so that the unfired internal conductor layer is exposed at an end portion of the unfired laminate. Further, a conductor paste containing a conductor metal is printed on an end surface of the unfired laminate by the screen printing method or the like to form an unfired underlying metal.

Next, the unfired laminate with the unfired underlying metal formed thereon is fired at 870° C. to 930° C. for 0.5 to 3 hours in an oxygen atmosphere or a non-oxidizing atmosphere so that the unfired laminate and the unfired underlying metal are co-fired.

Further, a surface of an underlying metal obtained by firing the unfired underlying metal is subjected to a wet plating process such as electrolytic plating so that a plating layer is formed thereon to form the external electrode 6. In the above-described manner, the multilayer filter 1 is obtained in which the stripline 3, the ground plane 4, and the internal conductor pattern 7 are formed between the respective layers of the ceramic base 2, and the external electrode 6 is formed on a surface of the ceramic base 2. As described above, the ceramic base 2 is formed of the ceramic composition according to the embodiment of the present invention.

In the multilayer filter 1 in one embodiment, the permittivity ε of the ceramic base 2 is 7 to 15, the Q×f value of the ceramic base 2 is 10000 or more, and an absolute value of the temperature coefficient τf of resonance frequency of the ceramic base 2 at a temperature in a range of –25° C. to 85° C. is $30 \times 10^{-6}/°$ C. or less, and thus the multilayer filter 1 has excellent dielectric characteristics in a high-frequency region. Furthermore, the ceramic base 2 can be sintered at such a temperature that it can be co-fired with a low-resistance metal such as Ag, an Ag alloy, Cu, or a Cu alloy, and thus any of these low-resistance metals can be used as the conductor metal.

The multilayer filter 1 is an example of an electronic component in one embodiment. The electronic component in one embodiment can encompass, in addition to a filter, a single-layer substrate, a multilayer substrate, a capacitor, and any other electronic component.

Herein, the contents of the components contained in the ceramic composition refer to the contents thereof in the sintered ceramic composition (namely, the contents thereof in the sintered body of the ceramic composition), unless otherwise mentioned. The components contained in the ceramic composition are the Li component, the B component, and any components, which are the Al component, the Zn component, the Cu component, the Ag component, the Co component, the Zr component, the Bi component, the Na component, the K component, the Ca component, the Mg component, the Ba component, and the P component. The contents of these components in the sintered ceramic composition are measured by, for example, ICP (inductively coupled plasma) mass analysis, titrimetric analysis, or any other known method.

EXAMPLES

Predetermined amounts of $SiO_2$ powder, CaO powder, and MgO powder were wet mixed for 15 hours and then dried at 120° C., and a dried powder body thus obtained was calcined at 1200° C. for 2 hours in the atmosphere. A calcined object thus obtained was pulverized, and thus diopside crystal powder having an average grain size of 1.1 μm was manufactured. As a result of measuring the amounts of $SiO_2$, CaO, and MgO contained in the diopside crystal powder by ICP, the amount of $SiO_2$ was 55 mass %, the amount of MgO was 18.8 mass %, and the amount of CaO was 26.2 mass %. Predetermined amounts of $Li_2O$ powder and $B_2O_3$ powder were weighed and added to the diopside crystal powder, and a mixture thus obtained was wet mixed for 15 hours and then dried at 150° C. An adequate amount of PVA-based binder was added to the dried mixture, and granulation and press-molding were performed with respect thereto to obtain a sheet-shaped unheated molded body having a thickness of 10 μm. This pre-molded body obtained by press-molding was heated at 500° C. in the atmosphere and subjected to the binder removal process, and thus a sheet molded body was obtained. An Ag paste was printed on each of upper and lower surfaces of the sheet molded body, and the sheet molded body and the Ag paste were co-fired at 900° C. for 2 hours in the atmosphere. In this manner, ceramic compositions (sintered bodies) of Sample Nos. 1 to 33 were obtained. Each of the ceramic compositions is sheet-shaped and includes, on each of upper and lower surfaces thereof, a conductive layer formed by firing an Ag paste. The contents of diopside ($CaMgSi_2O_6$), $Li_2O$, and $B_2O_3$ contained in each of the samples were measured by the ICP mass analysis. Table 1 shows results of the measurement.

TABLE 1

| Sample No. | Composition (wt %) | | | | Items to be Evaluated | | |
|---|---|---|---|---|---|---|---|
| | $CaMgSi_2O_6$ | $Li_2O$ | $B_2O_3$ | $Li_2O + B_2O_3$ | Sinterability | Q Value | High-temperature Reliability |
| No. 1 | 100 | 0.30 | 0.05 | 0.35 | x | — | — |
| No. 2 | 100 | 0.25 | 0.10 | 0.35 | x | — | — |
| No. 3 | 100 | 0.30 | 0.10 | 0.40 | x | — | — |
| No. 4 | 100 | 0.30 | 0.15 | 0.45 | ○ | 2100 | ○ |
| No. 5 | 100 | 0.40 | 0.20 | 0.60 | ○ | 1900 | ○ |
| No. 6 | 100 | 0.60 | 0.30 | 0.90 | ○ | 1700 | ○ |
| No. 7 | 100 | 0.80 | 0.40 | 1.20 | ○ | 1500 | ○ |
| No. 8 | 100 | 1.00 | 0.50 | 1.50 | ○ | 1250 | ○ |
| No. 9 | 100 | 1.20 | 0.60 | 1.80 | ○ | 1100 | ○ |
| No. 10 | 100 | 1.40 | 0.70 | 2.10 | ○ | 1000 | ○ |
| No. 11 | 100 | 1.40 | 0.85 | 2.25 | ○ | 800 | ○ |
| No. 12 | 100 | 1.40 | 1.00 | 2.40 | ○ | 740 | x |
| No. 13 | 100 | 0.5 | 0.7 | 1.2 | x | — | — |
| No. 14 | 100 | 0.6 | 0.6 | 1.2 | ○ | 1450 | ○ |
| No. 15 | 100 | 0.7 | 0.5 | 1.2 | ○ | 1480 | ○ |
| No. 16 | 100 | 0.9 | 0.3 | 1.2 | ○ | 1520 | ○ |
| No. 18 | 100 | 1 | 0.2 | 1.2 | ○ | 1550 | ○ |
| No. 19 | 100 | 1.1 | 0.10 | 1.2 | ○ | 1560 | ○ |
| No. 20 | 100 | 1.15 | 0.05 | 1.2 | x | — | — |
| No. 21 | 100 | 1.125 | 1.13 | 2.25 | ○ | 750 | x |
| No. 22 | 100 | 1.25 | 1.00 | 2.25 | ○ | 780 | ○ |
| No. 23 | 100 | 1.50 | 0.75 | 2.25 | ○ | 820 | ○ |
| No. 24 | 100 | 1.60 | 0.65 | 2.25 | ○ | 880 | x |
| No. 25 | 100 | 0.25 | 0.2 | 0.45 | x | — | — |
| No. 26 | 100 | 0.35 | 0.1 | 0.45 | ○ | 2200 | ○ |
| No. 27 | 100 | 0.4 | 0.05 | 0.45 | x | — | — |
| No. 28 | 100 | 0.3 | 1.13 | 1.425 | ○ | 760 | x |
| No. 29 | 100 | 0.9 | 1.13 | 2.025 | ○ | 750 | x |
| No. 30 | 100 | 1.5 | 0.13 | 0.625 | ○ | 720 | x |
| No. 31 | 100 | 1.60 | 1.15 | 2.75 | ○ | 910 | x |
| No. 32 | 100 | 1.60 | 0.45 | 2.05 | ○ | 900 | x |
| No. 33 | 100 | 1.60 | 0.75 | 2.35 | ○ | 850 | x |

For each of the samples, sinterability, a Q value, and high-temperature reliability were evaluated. Table 1 shows results of the evaluation. For each of the samples, sinterability was evaluated based on a relative density measured by the Archimedes' method. That is, a sample having a measured relative density of 98% or more was evaluated as being sinterable, and a sample having a measured relative density of less than 98% was evaluated as being non-sinterable. In Table 1, a character "O" is entered in a column titled "Sinterability" for the sample evaluated as being sinterable, and a character "x" is entered in the column titled "Sinterability" for the sample evaluated as being non-sinterable.

For each sample evaluated as being sinterable, a permittivity and dielectric loss at a resonance frequency of 10 GHz to 15 GHz were measured in conformity to JIS R1627. The dielectric loss was converted into a value at 10 GHz, assuming that (Frequency)×(1/Dielectric Loss)=(Constant).

In a high-temperature reliability test for evaluating high-temperature reliability, at a temperature of 150° C., a voltage having an electric field strength of 1 V/μm was applied between the conductive layers provided respectively on the upper and lower surfaces of each of the samples. A point in time of the occurrence of a short circuit (a point in time when insulation resistance fell below $10^{-5}\Omega$) was regarded as the occurrence of a failure, and a sample having a failure time of more than 1000 hours was evaluated as being an acceptable product, and a sample having a failure time of 1000 hours or less was evaluated as a defective product. The high-temperature reliability test was carried out with respect to each sample evaluated as being sinterable. In Table 1, a character "O" is entered in a column titled "High-temperature Reliability" for the sample evaluated as being an acceptable product in the high-temperature reliability test, and a character "x" is entered in the column titled "High-temperature Reliability" for the sample evaluated as being a defective product in the same test.

Based on the results of the evaluation on sinterability of Sample No. 1 to Sample No. 12, it has been found that sintering occurs at 900° C. when $Li_2O$ and $B_2O_3$ are contained in a total amount larger than 0.40 parts by mass relative to 100 parts by mass of a diopside crystal (a principal component) and does not occur at 900° C. when a total content of $Li_2O$ and $B_2O_3$ is 0.40 parts by mass or less relative thereto.

Based on the results of the high-temperature reliability test with respect to Sample No. 11 and Sample No. 12, it has been found that poor high-temperature reliability results when a total content of $Li_2O$ and $B_2O_3$ is larger than 2.25 parts by mass relative to 100 parts by mass of the diopside crystal. Conceivably, this is because a Li—B-based liquid phase segregating into a periphery or a grain boundary of diopside crystal grains is cooled to form a glassy phase, and the volume of the glassy phase is increased.

Based on the results of the evaluation on sinterability of Sample No. 13 to Sample No. 20 (where Sample No. 17 is omitted), it has been confirmed that sintering does not occur at 900° C. when $B_2O_3$ is contained in an amount larger than the amount of $Li_2O$ contained. Conceivably, this is because solubility of diopside ($CaMgSi_2O_6$) with respect to a liquid phase decreases with a decrease in ratio of Li in a Li—B-based liquid phase produced at the time of sintering. Furthermore, based on the results of the evaluation on sinterability of Sample No. 19 and Sample No. 20, it has been confirmed that sintering does not occur at 900° C. when the content of $B_2O_3$ is smaller than 0.1 parts by mass relative to 100 parts by mass of the diopside crystal. Conceivably, this is because a Li—B-based liquid phase is no longer produced when the content of $B_2O_3$ is smaller than 0.1 parts by mass.

Based on the results of the high-temperature reliability test with respect to Sample No. 21 to Sample No. 24, it has been found that poor high-temperature reliability results when the content of $B_2O_3$ is larger than 1 part by mass relative to 100 parts by mass of the diopside crystal. Conceivably, this is because a B-rich Li—B-based liquid phase segregating into the periphery or the grain boundary of diopside crystal grains is cooled to form a glassy phase, and the volume of the glassy phase is increased. Furthermore, based on the results of the high-temperature reliability test with respect to Sample No. 21 to Sample No. 24, it has been found that poor high-temperature reliability results when the content of $Li_2O$ is larger than 1.5 parts by mass relative to 100 parts by mass of the diopside crystal. Conceivably, this is because a Li-rich Li—B-based liquid phase segregating into the periphery or the grain boundary of diopside crystal grains is cooled to form a glassy phase, and the volume of the glassy phase is increased.

Based on the results of the evaluation on sinterability of Sample No. 25 and Sample No. 4 described above, it has been confirmed that sintering does not occur at 900° C. when the content of $Li_2O$ is smaller than 0.3 parts by mass relative to 100 parts by mass of the diopside crystal. Conceivably, this is because solubility of diopside ($CaMgSi_2O_6$) with respect to a liquid phase decreases when the content of $Li_2O$ is smaller than 0.3 parts by mass. Furthermore, based on the results of the evaluation on sinterability of Sample No. 26 and Sample No. 27, it has been confirmed again that sintering does not occur at 900° C. when the content of $B_2O_3$ is smaller than 0.1 parts by mass relative to 100 parts by mass of the diopside crystal.

Based on the results of the high-temperature reliability test with respect to Sample No. 28 to Sample No. 30, it has been found that poor high-temperature reliability results, regardless of the content of $Li_2O$, when the content of $B_2O_3$ is larger than 1 part by mass relative to 100 parts by mass of the diopside crystal.

Based on the results of the high-temperature reliability test with respect to Sample No. 31 to Sample No. 33, it has been found that poor high-temperature reliability results, regardless of the content of $B_2O_3$, when the content of $Li_2O$ is larger than 1.5 parts by mass relative to 100 parts by mass of the diopside crystal.

What is claimed is:

1. A ceramic composition comprising:
    relative to 100 parts by mass of diopside crystal powder,
    0.3 to 1.5 parts by mass of a Li component in terms of an oxide thereof; and
    0.1 to 1 part by mass of a B component in terms of an oxide thereof,
    wherein the ceramic composition further comprises at least one component selected from a group consisting of a Zn component, a Co component, an Al component, a Zr component, a Bi component, a Ba component, a K component, and a Na component,
    wherein a content of the Li component in terms of an oxide thereof is larger than a content of the B component in terms of an oxide thereof,
    wherein a total content of the Li component and the B component is 2.25 parts by mass or less in terms of oxides thereof; and
    wherein a total content of the Li component, the B-component, and the at least one component is 0.5 to 6 parts by mass in terms of oxides thereof relative to 100 parts by mass of the diopside crystal powder.

2. The ceramic composition according to claim 1, further comprising:
    4 to 19 parts by mass of $SrTiO_3$ powder relative to 100 parts by mass of the diopside crystal powder.

3. The ceramic composition according to claim 2, comprising:
    6 to 10 parts by mass of the $SrTiO_3$ powder relative to 100 parts by mass of the diopside crystal powder.

4. The ceramic composition according to claim 1, further comprising:
    a total of 0 to 3 parts by mass of an Ag component and a Cu component in terms of oxides thereof relative to 100 parts by mass of the diopside crystal powder.

5. The ceramic composition according to claim 4, comprising:
    a total of 0 to 0.5 parts by mass of the Ag component and the Cu component in terms of oxides thereof.

6. An electronic component, comprising:
    a ceramic layer formed of the ceramic composition according to claim 1; and
    a conductor layer provided on a surface of and/or in an interior of the ceramic layer and obtained through co-firing with the ceramic composition.

7. The electronic component according to claim 6, wherein the conductor layer is made of Ag, Cu, or an alloy containing at least one of Ag and Cu.

\* \* \* \* \*